United States Patent
Kang et al.

(10) Patent No.: US 12,139,410 B2
(45) Date of Patent: Nov. 12, 2024

(54) AEROGEL BLANKET

(71) Applicant: LG CHEM, LTD., Seoul (KR)

(72) Inventors: Tae Gyeong Kang, Daejeon (KR); Bong June Kim, Daejeon (KR); Se Won Baek, Daejeon (KR); Hyun Woo Jeon, Daejeon (KR); Sung Min Yu, Daejeon (KR); Young Hun Kim, Daejeon (KR); Sang Woo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 32 days.

(21) Appl. No.: 17/621,830

(22) PCT Filed: Sep. 3, 2020

(86) PCT No.: PCT/KR2020/011867
§ 371 (c)(1),
(2) Date: Dec. 22, 2021

(87) PCT Pub. No.: WO2021/045533
PCT Pub. Date: Mar. 11, 2021

(65) Prior Publication Data
US 2022/0371902 A1    Nov. 24, 2022

(30) Foreign Application Priority Data

Sep. 3, 2019   (KR) .................. 10-2019-0109158
Sep. 30, 2019  (KR) .................. 10-2019-0121147
Jul. 15, 2020  (KR) .................. 10-2020-0087640

(51) Int. Cl.
C01B 33/158    (2006.01)
C01B 33/159    (2006.01)
(Continued)

(52) U.S. Cl.
CPC ........ *C01B 33/1585* (2013.01); *C01B 33/159* (2013.01); *C04B 14/064* (2013.01);
(Continued)

(58) Field of Classification Search
CPC ..... B01J 3/008; B01J 13/0091; C01B 33/155; C01B 33/1585; C01B 33/159;
(Continued)

(56) References Cited

U.S. PATENT DOCUMENTS 1,131,270 A    3/1915  Quick
5,789,075 A    8/1998  Frank et al.
(Continued)

FOREIGN PATENT DOCUMENTS

CN    101137587 A    3/2008
CN    101698583 A    4/2010
(Continued)

OTHER PUBLICATIONS

Machine Translation of WO-2017145359-A1 (Year: 2017).*
(Continued)

*Primary Examiner* — Colin W. Slifka
*Assistant Examiner* — Logan Edward Laclair
(74) *Attorney, Agent, or Firm* — Morgan, Lewis & Bockius LLP

(57) ABSTRACT

The present invention provides an aerogel blanket including a blanket base, aerogel coupled on the surface of the blanket base, and aerogel located at a space between the blanket bases, the aerogel coupled on the surface of the blanket base is 50 wt % based on the total weight of aerogel, wherein the aerogel blanket has the number of aerogel particles separated from the aerogel blanket ranging from 13,600 to 90,000 per ft³, when vibrating the aerogel blanket at a frequency of 1 Hz to 30 Hz for 2 hours to 10 hours.

14 Claims, 2 Drawing Sheets

(51) Int. Cl.
  *C04B 14/06* (2006.01)
  *C04B 30/02* (2006.01)
(52) U.S. Cl.
  CPC .......... *C04B 30/02* (2013.01); *C01P 2004/03* (2013.01); *C01P 2004/61* (2013.01); *C01P 2006/32* (2013.01); *C04B 2201/32* (2013.01)
(58) Field of Classification Search
  CPC ................. C01B 33/145; C01B 33/158; C01P 2006/32; C01P 2004/03; C01P 2004/61; C04B 14/064; C04B 30/02; C04B 2201/32; Y02E 60/13
  See application file for complete search history.

(56) References Cited

U.S. PATENT DOCUMENTS

| | | |
|---|---|---|
| 5,830,387 A | 11/1998 | Yokogawa et al. |
| 6,068,882 A | 5/2000 | Ryu |
| 6,364,953 B1 | 4/2002 | Kawakami et al. |
| 6,799,442 B1 | 10/2004 | Costa et al. |
| 2001/0034375 A1 | 10/2001 | Schwertfeger et al. |
| 2005/0046086 A1 | 3/2005 | Lee et al. |
| 2005/0167891 A1 | 8/2005 | Lee et al. |
| 2008/0093016 A1 | 4/2008 | Lee et al. |
| 2009/0123358 A1 | 5/2009 | Costa et al. |
| 2012/0025127 A1 | 2/2012 | Yeo et al. |
| 2016/0096949 A1 | 4/2016 | Evans et al. |
| 2018/0009969 A1 | 1/2018 | Kim et al. |
| 2018/0029892 A1 | 2/2018 | Yu et al. |
| 2018/0072578 A1 | 3/2018 | Kim et al. |
| 2018/0094114 A1 | 4/2018 | Evans et al. |
| 2018/0112057 A1 | 4/2018 | Evans et al. |
| 2018/0112058 A1 | 4/2018 | Evans et al. |
| 2018/0134867 A1 | 5/2018 | Evans et al. |
| 2018/0147811 A1 | 5/2018 | Oh et al. |
| 2018/0148888 A1 | 5/2018 | Kim et al. |
| 2018/0179073 A1 | 6/2018 | Oh et al. |
| 2018/0179074 A1 | 6/2018 | Kim et al. |
| 2018/0179075 A1 | 6/2018 | Kim et al. |
| 2018/0244029 A1 | 8/2018 | Kim et al. |
| 2018/0264793 A1 | 9/2018 | Kim et al. |
| 2018/0326700 A1 | 11/2018 | Kim |
| 2018/0354805 A1 | 12/2018 | Kim et al. |
| 2019/0002356 A1 | 1/2019 | Hebalkar |
| 2019/0062167 A1 | 2/2019 | Kim et al. |
| 2019/0119494 A1 | 4/2019 | Makino et al. |
| 2019/0203014 A1 | 7/2019 | Evans et al. |
| 2019/0276322 A1 | 9/2019 | Kim et al. |
| 2020/0025324 A1 | 1/2020 | Izumi et al. |
| 2020/0048100 A1 | 2/2020 | Yu et al. |
| 2020/0215791 A1 | 7/2020 | Oh et al. |
| 2020/0216322 A1 | 7/2020 | Min et al. |
| 2020/0255295 A1 | 8/2020 | Kim et al. |
| 2020/0308011 A1 | 10/2020 | Kim et al. |
| 2021/0114887 A1 | 4/2021 | Oh et al. |
| 2021/0155486 A1 | 5/2021 | Kang et al. |
| 2021/0198112 A1 | 7/2021 | Oh et al. |
| 2022/0048778 A1 | 2/2022 | Kim et al. |

FOREIGN PATENT DOCUMENTS

| | | |
|---|---|---|
| CN | 103910516 A | 7/2014 |
| CN | 104164758 A | 11/2014 |
| CN | 105597635 A | 5/2016 |
| CN | 105664809 A | 6/2016 |
| CN | 106630930 A | 5/2017 |
| CN | 106794996 A | 5/2017 |
| CN | 107034678 A | 8/2017 |
| CN | 107129262 A | 9/2017 |
| CN | 107406327 A | 11/2017 |
| CN | 107523275 A | 12/2017 |
| CN | 107531495 A | 1/2018 |
| CN | 107709013 A | 2/2018 |
| CN | 107735362 A | 2/2018 |
| CN | 107735385 A | 2/2018 |
| CN | 107848815 A | 3/2018 |
| CN | 207310663 U | 5/2018 |
| CN | 108136749 A | 6/2018 |
| CN | 108383129 A | 8/2018 |
| CN | 108585762 A | 9/2018 |
| CN | 108658572 A | 10/2018 |
| CN | 108689678 A | 10/2018 |
| CN | 108821741 A | 11/2018 |
| CN | 109415214 A | 3/2019 |
| CN | 109437832 A | 3/2019 |
| CN | 109868598 A | 6/2019 |
| CN | 110615663 A | 12/2019 |
| CN | 111925186 A | 11/2020 |
| EP | 3 284 720 A1 | 2/2018 |
| EP | 3 375 757 A1 | 9/2018 |
| EP | 3453676 A1 | 3/2019 |
| EP | 3569304 A1 | 11/2019 |
| EP | 3 778 483 A1 | 2/2021 |
| EP | 3 878 812 A1 | 9/2021 |
| EP | 3 901 094 A1 | 10/2021 |
| JP | 2001-007100 A | 1/2001 |
| JP | 2001-072408 A | 3/2001 |
| JP | 2003-513873 A | 4/2003 |
| JP | 4115088 B2 | 7/2008 |
| JP | 2008-532898 A | 8/2008 |
| JP | 2011-190136 A | 9/2011 |
| JP | 2012-144428 A | 8/2012 |
| JP | 2014-173222 A | 9/2014 |
| JP | WO2017/010551 A1 | 1/2017 |
| JP | 2017-533163 A | 11/2017 |
| JP | 2018-523022 A | 8/2018 |
| JP | 2018-532682 A | 11/2018 |
| JP | 2018-535178 A | 11/2018 |
| JP | 2018-204725 A | 12/2018 |
| JP | 2018-537311 A | 12/2018 |
| JP | 2018-537383 A | 12/2018 |
| JP | 2018-538224 A | 12/2018 |
| JP | 2021-523869 A | 9/2021 |
| KR | 10-2001-0104372 A | 11/2001 |
| KR | 10-0372823 B1 | 2/2003 |
| KR | 10-0385829 B1 | 10/2003 |
| KR | 10-0710887 B1 | 4/2007 |
| KR | 10-2007-0114668 A | 12/2007 |
| KR | 10-0831877 B1 | 5/2008 |
| KR | 10-2010-0053350 A | 5/2010 |
| KR | 10-2010-0133268 A | 12/2010 |
| KR | 10-2011-0067163 A | 6/2011 |
| KR | 10-2011-0082379 A | 7/2011 |
| KR | 10-2011-0126381 A | 11/2011 |
| KR | 10-2012-0012836 A | 2/2012 |
| KR | 10-1147494 B1 | 5/2012 |
| KR | 10-2012-0070948 A | 7/2012 |
| KR | 10-1176137 B1 | 8/2012 |
| KR | 10-2014-0120721 A | 10/2014 |
| KR | 10-1498562 B1 | 3/2015 |
| KR | 10-2016-0101330 A | 8/2016 |
| KR | 2017-0031011 A | 3/2017 |
| KR | 10-2017-0063800 A | 6/2017 |
| KR | 10-2017-0086831 A | 7/2017 |
| KR | 10-2017-0096513 A | 8/2017 |
| KR | 10-2017-0096514 A | 8/2017 |
| KR | 10-2017-0098003 A | 8/2017 |
| KR | 10-2017-0098592 A | 8/2017 |
| KR | 10-2017-0112985 A | 10/2017 |
| KR | 10-2018-0029235 A | 3/2018 |
| KR | 10-2018-0033064 A | 4/2018 |
| KR | 2018-0132723 A | 12/2018 |
| KR | 10-2019-0008007 A | 1/2019 |
| KR | 10-1953349 B1 | 2/2019 |
| KR | 20190021956 A | 3/2019 |
| KR | 10-1953347 B1 | 5/2019 |
| KR | 10-2019-0063799 A | 6/2019 |
| KR | 10-2019-0065325 A | 6/2019 |
| KR | 10-2019-0078765 A | 7/2019 |
| KR | 10-2019-0098728 A | 8/2019 |
| KR | 10-2023531 B1 | 9/2019 |
| KR | 10-2020-0063084 A | 6/2020 |
| WO | 2016/054524 A2 | 4/2016 |

(56) References Cited

FOREIGN PATENT DOCUMENTS

| WO | WO-2017145359 A1 * | 8/2017 |
| WO | 2017/171217 A1 | 10/2017 |
| WO | 2018/208005 A1 | 11/2018 |
| WO | 2019/039841 A1 | 2/2019 |
| WO | 2019/098519 A1 | 5/2019 |
| WO | 2019/107706 A1 | 6/2019 |
| WO | 2021/045483 A1 | 3/2021 |

OTHER PUBLICATIONS

Yokogawa et al (Hydrophobic silica aerogels, Non-Crystalline Solids, 1995) (Year: 1995).*
Extended European search report issued in corresponding European Patent Application No. 20861673.0 dated Dec. 1, 2021.
Extended European search report issued in corresponding European Patent Application No. 20860326.6 dated Jan. 4, 2022.
Extended European search report issued in corresponding European Patent Application No. 20860342.3 dated Jan. 21, 2022.
Aspen Aerogel, AR5100, Vibration Testing Report, Feb. 4, 2003.
International Search Report issued in corresponding International Patent Application No. PCT/KR2020/011867 Dec. 21, 2020.
Extended European Search Report issued in corresponding European Patent Application No. 20860200.3 dated Sep. 27, 2022.
Extended European Search Report issued in corresponding European Patent Application No. 20859770.8 dated Sep. 30, 2022.
International Search Report issued in corresponding International Patent Application No. PCT/KR2020/011867 dated Dec. 21, 2020.
Ma et al., "Preparation and Low-temperature Properties of Fiber Reinforced SiO2 Aerogel Composites," Materials Review, 2015, vol. 29, No. 10, pp. 43-46 (see English abstract).
Zhang et al., "Hygrothermal performance of silica aerogel composite for thermal insulation material," New Building Materials, 2017, No. 3, pp. 67-71 (see English abstract).
Office Action issued in the corresponding U.S. Appl. No. 17/425,906, dated Apr. 12, 2023.
Rao et al., "Synthesis and Characterization of Hydrophobic TMES/ TEOS Based Silica Aerogels," Journal of Porous Materials, 2003, pp. 23-29, Maharashtra State, India.
Iswar et al., "Effect of aging on silica aerogel properties," 2017, Microporous and Mesoporous Materials, vol. 241, p. 293-302.
Yokogawa et al., "Hydrophobic silica aerogels", 1995, Journal of Non-Crystalline Solids, vol. 186, p. 23-29.
Final Office Action issued Sep. 11, 2023 for counterpart U.S. Appl. No. 17/425,906.
Non-Final Office Action issued Oct. 19, 2023 for counterpart U.S. Appl. No. 17/416,619.
Final Office Action issued Nov. 2, 2023 for counterpart U.S. Appl. No. 17/429,116.
Lee, et al. "Super-insulating, flame-retardant, and flexible poly(dimethylsiloxane) composites based on silica aerogel," Composites Part A: Applied Science and Manufacturing, vol. 123, p. 108-113, 2019 https://doi.org/10.1016/j.compositesa.2019.05.004.
Non-Final Office Action issued on Feb. 20, 2024 for U.S. Appl. No. 17/429,116.

* cited by examiner

AEROGEL BLANKET

CROSS-REFERENCE TO RELATED APPLICATIONS

This application claims the benefit of Korean Patent Application Nos. 10-2019-0109158, filed on Sep. 3, 2019, 10-2019-0121147, filed on Sep. 30, 2019, and 10-2020-0087640, filed on Jul. 15, 2020, the disclosures of which are incorporated by reference herein, in their entirety.

TECHNICAL FIELD

The present invention relates to an aerogel blanket, and more specifically, to an aerogel blanket in which separation of aerogel particles by vibration and thus degradation of performance are suppressed.

BACKGROUND ART

Aerogel is an ultra-porous material having a high specific surface area ($\geq 500$ m$^2$/g) with a porosity of 90-99.9% and a pore size ranging of 1-100 nm. Since the aerogel has characteristics such as excellent lightweight/ultra-insulation/ultra-low dielectric properties, not only studies on the development of aerogel materials but also application studies on transparent insulation materials, environmentally friendly high-temperature insulation materials, ultra-low dielectric thin film materials for highly integrated devices, materials for catalysts and catalyst carriers, electrode materials for super capacitors, and electrode materials for seawater desalination are being actively conducted.

The biggest advantage of aerogel is that the aerogel has super-insulation that shows a thermal conductivity of 0.003 W/m·K or less which is lower than an organic insulation material such as Styrofoam, and can solve fire vulnerability and toxic gas generation in fire, which are fatal weaknesses of the organic insulation material.

In general, aerogel is produced by preparing hydrogel from a precursor material and removing liquid components inside the hydrogel without destroying microstructures. Aerogel has typical forms which can be divided into three: powder, granule, monolith, and is generally produced in a form of powder.

The aforementioned powder may be combined with fibers so as to be commercialized in the form such as an aerogel blanket or aerogel sheet. Since the blanket or sheet has flexibility, the blanket or sheet may be bent, folded, or cut in any size or form. Thus, the aerogel may be applied not only to industrial applications such as insulation panels for LNG carriers, industrial insulation materials, and insulation materials for space suits, transportation and vehicles, and power generation, but also to household goods such as jackets and sneakers. Also, when the aerogel is used for fire doors as well as roofs or floors in a house such as apartments, there is a great effect in preventing fire.

Specifically, the aerogel blanket is formed of aerogel which is physically coupled and impregnated to a blanket base such as a fiber, and aerogel particles have a small size and a very low density, and thus are easily scattered. Due to these characteristics, aerogel particles are generally separated and scattered from the blanket base when the aerogel blanket is stored, carried, and used in construction, and thus there is a limitation in that a working environment is deteriorated and the performance of the aerogel blanket itself is reduced.

In particular, when the aerogel blanket is installed in a pipe, a continuous vibration of the pipe makes the aerogel particles continuously separated from the aerogel blanket to gradually degrade the performance thereof, thereby resulting in significant performance degradation of the aerogel blanket.

Therefore, the development of the aerogel blanket with improved vibration durability has been required which is capable of minimizing the separation of the aerogel particles by vibration and thus degradation of performance of the aerogel blanket.

DISCLOSURE OF THE INVENTION

Technical Problem

An aspect of the present invention provides an aerogel blanket in which separation of aerogel particles by vibration and thus degradation of performance are suppressed.

Technical Solution

According to an aspect of the present invention, there is provided an aerogel blanket including a blanket base, aerogel coupled on the surface of the blanket base, and aerogel located at a space between the blanket bases, wherein the aerogel blanket has the number of aerogel particles separated from the aerogel blanket ranging from 13,600 to 90,000 per ft$^3$, when vibrating the aerogel blanket at a frequency of 1 Hz to 30 Hz for 2 hours to 10 hours.

Advantageous Effects

The aerogel blanket of the present invention includes a blanket base, aerogel coupled on the surface of the blanket base, and aerogel located at a space between the blanket bases, and since the aerogel is coupled on the surface of the blanket base to suppress separation of aerogel particles by vibration, deterioration of the physical properties such as an increase in thermal conductivity of the aerogel blanket due to the separation is minimized.

BRIEF DESCRIPTION OF THE DRAWINGS

The following drawings attached herein illustrates a preferred embodiment of the present invention by example, and serves to enable technical concepts of the present invention to be further understood together with detailed description of the invention given below, and therefore the present invention should not be interpreted only with matters in such a drawing.

BEST MODE FOR CARRYING OUT THE INVENTION

Figure 1:
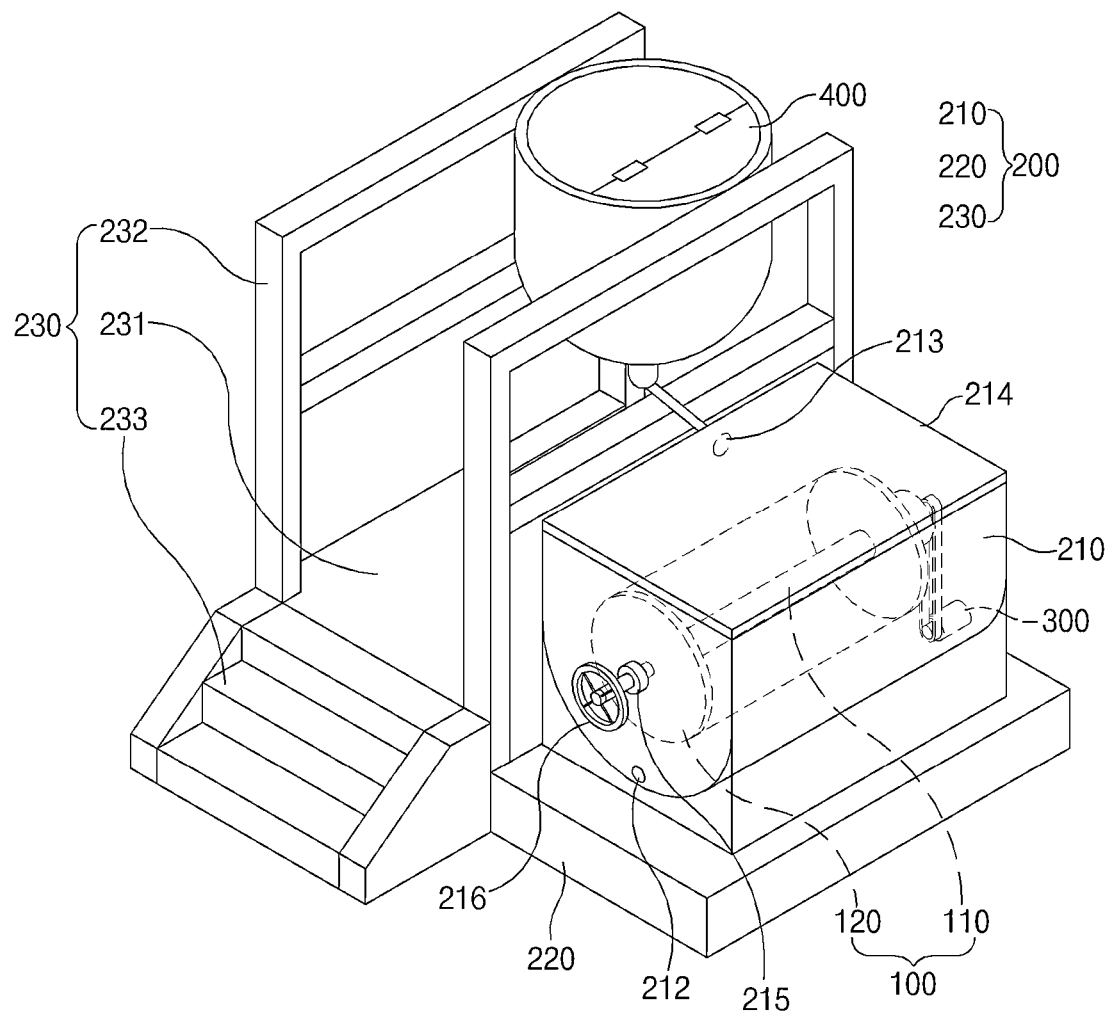
FIG. 1 is a perspective view illustrating an embodiment of a production device used in an embodiment of a method for producing an aerogel blanket according to an embodiment of the present invention.

Hereinafter, the present invention will be described in more detail to aid in understanding the present invention. In this case, it will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

An aerogel blanket of the present invention includes a blanket base, aerogel coupled on the surface of the blanket base, and aerogel located at a space between the blanket bases, wherein the aerogel blanket has the number of aerogel particles separated from the aerogel blanket ranging from 13,600 to 90,000 per ft$^3$, when vibrating the aerogel blanket at a frequency of 1 Hz to 30 Hz for 2 hours to 10 hours.

In the present invention, the vibration condition is based on the time when the aerogel blanket is vibrated at a frequency of 1 Hz to 30 Hz for 2 hours to 10 hours. The vibration condition may be more specifically limited, the frequency may be, specifically, 6 Hz to 24 Hz, and the vibration time may be specifically, 4 hours to 8 hours, and more specifically, 6 hours.

The aerogel blanket of the present invention includes a blanket base and aerogel, and a large amount of aerogel is coupled on the surface of the blanket base, and thus even if an external force such as vibration is applied to the aerogel blanket, the separation of the aerogel from this may be minimized. The phrase "aerogel coupled on the surface of the aerogel blanket" herein means that when the aerogel included in the aerogel blanket has a shape such as a particle, a piece, or a plane, any one part of the aerogel particle, piece, or plane is physically coupled to the blanket base. In contrast, the phrase "aerogel located at a space between the blanket bases" means that the aerogel is not physically coupled to the blanket base at all, and is located at a space formed by the blanket bases in a shape such as an independent particle, piece, or plane.

Whether a large amount of aerogel is firmly coupled to the blanket base may be evaluated through the number of the aerogel separated from the aerogel blanket after vibrating the aerogel blanket. If the aerogel included in the aerogel blanket is not coupled with the blanket base, the aerogel is highly likely to be separated from the aerogel blanket, and thus this may be evaluated by measuring the number of separated aerogel particles.

The aerogel blanket of the present invention satisfies 13,600 to 90,000 per ft$^3$ of the number of aerogel particles separated from the aerogel blanket when vibrating the aerogel blanket at a frequency of 1 Hz to 30 Hz for 2 hours to 10 hours. In an embodiment of the present invention, when vibrating the aerogel blanket at a frequency of 1 Hz to Hz for 2 hours to 10 hours, the number of aerogel particles separated from the aerogel blanket may be, particularly, 25,800 to 89,000 per ft$^3$, and more particularly, 40,900 to 88,500 per ft$^3$.

The aerogel blanket of the present invention may satisfy the above range of the number of separation particles because a large amount of aerogel is firmly coupled on the surface of the blanket base, and thus even if an external force such as vibration is applied to the aerogel blanket, the aerogel separated from the aerogel blanket is minimized.

Since a large amount of aerogel is firmly coupled on the surface of the blanket base and thus the separation of the aerogel particles by an external force such as vibration is minimized, changes in physical properties such as thermal conductivity of the aerogel blanket may be suppressed even when an external force such as vibration is applied. When vibrating the aerogel blanket at a frequency of 1 Hz to 30 Hz for 2 hours to 10 hours, the aerogel blanket of the present invention may have a rate of increase in thermal conductivity after vibration of 1.5% or less, particularly, 1.48% or less, and more particularly, 1.45% or less, and the minimum value of the rate of increase in thermal conductivity may be 0.10%, particularly, 0.15%, and more particularly, 0.20%.

The rate of increase in thermal conductivity represents thermal conductivities in comparison before and after vibrating the aerogel blanket, and particularly, may be represented by Equation 1 below:

[Equation 1]

$$\text{Rate of increase in thermal conductivity (\%)} = \frac{\text{thermal conductivity after vibration} - \text{thermal conductivity before vibration}}{\text{thermal conductivity before vibration}} \times 100$$

Since the separation of aerogel from the aerogel blanket is minimized, the aerogel blanket according to the present invention may also have a small value of the number of aerogel particles separated from the aerogel blanket after vibration.

In addition, when vibrating the aerogel blanket according to an embodiment of the present invention at a frequency of 1 Hz to 30 Hz for 2 hours to 10 hours, the number of aerogel particles, which are separated from the aerogel blanket and have a particle diameter of more than 0.5 μm to 1.0 μm or less, may satisfy 10,000 to 58,000 per ft$^3$, particularly, 20,000 to 57,000 per ft$^3$, and more particularly, 30,000 to 56,000 per ft$^3$.

In addition, when vibrating the aerogel blanket according to an embodiment of the present invention at a frequency of 1 Hz to 30 Hz for 2 hours to 10 hours, the number of aerogel particles, which are separated from the aerogel blanket and have a particle diameter of more than 1.0 μm to 2.0 μm or less, may satisfy 3,000 to 28,000 per ft$^3$, particularly, 5,000 to 27,500 per ft$^3$, and more particularly, 10,000 to 27,000 per ft$^3$.

In addition, when vibrating the aerogel blanket according to an embodiment of the present invention at a frequency of 1 Hz to 30 Hz for 2 hours to 10 hours, the number of aerogel particles, which are separated from the aerogel blanket and have a particle diameter of more than 2.0 μm to 5.0 μm or less, may satisfy 500 to 4,000 per ft$^3$, particularly, 700 to 4,000 per ft$^3$, and more particularly, 800 to 3,900 per ft$^3$.

In addition, when vibrating the aerogel blanket according to an embodiment of the present invention at a frequency of 1 Hz to 30 Hz for 2 hours to 10 hours, the number of aerogel particles, which are separated from the aerogel blanket and have a particle diameter of more than 5.0 μm to 10.0 μm or less, may satisfy 10 to 700 per ft$^3$, particularly, 20 to 650 per ft$^3$, and more particularly, 40 to 600 per ft$^3$.

In the present invention, the particle diameter of the aerogel particle may be measured by, for example, observing through electron microscope using scanning electron microscopy (SEM), field emission scanning electron microscopy (FE-SEM), etc., or by a laser diffraction method. In case of measuring by the laser diffraction method, more particularly, the separated aerogel particles are dispersed in a dispersion medium and introduced into a commercially available laser diffraction particle size measurement apparatus (for example, Microtrac MT 3000), and then, a particle diameter distribution may be computed.

In the aerogel blanket according to the present invention, since the separation of the aerogel from the aerogel blanket is minimized, the number of aerogel particles separated from the aerogel blanket after vibration may satisfy the specific range above, and thus a weight reduction ratio of the aerogel blanket after vibration may also be minimized.

When vibrating the aerogel blanket according to an embodiment of the present invention at a frequency of 1 Hz to 30 Hz for 2 hours to 10 hours, the weight reduction ratio after vibration may be 0.3 wt % or less, particularly, 0.25 wt % or less, and more particularly, 0.23 wt % or less. Meanwhile, the minimum value of the weight reduction ratio may be 0.01 wt %, particularly, 0.05 wt %, and more particularly, 0.1 wt %.

The aerogel blanket of the present invention may exhibit an excellent effect of suppressing an increase in thermal conductivity after vibration because the separation of the aerogel particles by vibration is suppressed regardless of whether the surface is hydrophobically modified. That the aerogel of the present invention exhibits an excellent effect of suppressing an increase in thermal conductivity after vibration regardless of whether the surface is hydrophobically modified is because a large amount of aerogel is physically coupled to the surface of the blanket base.

In an embodiment of the present invention, the aerogel blanket of the present invention may be a silica aerogel blanket, and the aerogel blanket of the present invention is not affected by whether the silica aerogel blanket is hydrophobicated, and thus may be a hydrophilic silica aerogel blanket or a hydrophobic silica aerogel blanket.

The aerogel blanket of the present invention may be usefully used as a heat insulation material, a heat reserving material, or an incombustible material for a plant facility for thermal insulation such as industrial furnaces or pipes of various industrial equipment as well as for aircraft, ships, automobiles, and building structures.

In the aerogel blanket according to the present invention, that a large amount of aerogel can be firmly coupled on the surface of the blanket base may be a characteristic derived from a method for producing an aerogel blanket according to the present invention. That is, the aerogel blanket of the present invention may have the above-described characteristics due to the production method thereof. Hereinafter, a method for producing an aerogel blanket of the present invention will be described.

The aerogel blanket according to an embodiment of the present invention may be produced by a production method including: 1) adding a catalyzed sol and a blanket base to a reaction container to impregnate the catalyzed sol into the blanket base; and 2) gelating the blanket base impregnated with the catalyzed sol while rotating the blanket base.

Step 1

Step 1) is preparing in order to form an aerogel blanket, and impregnating a catalyzed sol into a blanket base. The catalyzed sol may be impregnated into the blanket base by preparing the catalyzed sol and adding the prepared catalyzed sol and the blanket base into a reaction container.

The term "impregnation" herein may be carried out by adding a catalyzed sol having fluidity into a blanket base, and may represent that the catalyzed sol is permeated through pores inside the blanket base.

In addition, in an embodiment of the present invention, the addition order is not particularly limited as long as the blanket base and the catalyzed sol are added to the reaction container in step 1) above. Specifically, in step 1) above, the addition may be carried out by any one method from among a method of adding the catalyzed sol to the reaction container after adding the blanket base thereto, a method of adding the blanket base to the reaction container after adding the catalyzed sol thereto, and a method of adding the blanket base to the reaction container while adding the catalyzed sol thereto. Among these, the method of adding the catalyzed sol after adding the blanket base in order to impregnating more uniformly may be more preferable. Specifically, in the case of adding the blanket base first, since the blanket base can be rotated when the catalyzed sol is added, more uniform impregnation may be induced.

According to an embodiment of the present invention, the impregnation in step 1) above may be carried out while rotating the blanket base as described above. When the impregnation is carried out while rotating the blanket base, it is more preferable that uniform impregnation may be induced because the catalyzed sol is brought into uniformly contact with all the surfaces of the blanket base.

In the present invention, the catalyzed sol may be prepared by mixing a sol with a base catalyst, and the base catalyst allows the sol to increase in pH, thereby promoting the gelation in step 2).

In this case, the sol is not limited as long as the sol is a material capable of forming porous gel by a sol-gel reaction. Particularly, the sol may include an inorganic sol, an organic sol, or a combination thereof. The inorganic sol may comprise zirconia, yttrium oxide, hafnia, alumina, titania, ceria, silica, magnesium oxide, calcium oxide, magnesium fluoride, calcium fluoride and combinations thereof, and the organic sol may comprise polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polycyanurates, polyacrylamides, various epoxies, agar, agarose, and combinations thereof. In addition, the sol may preferably be a silica sol in that excellent miscibility with the blanket base is secured, a gel may have more improved porosity when forming the gel, and an aerogel blanket having a low thermal conductivity may be produced.

In an embodiment of the present invention, the sol contains a sol precursor, water, and an organic solvent, and the sol may be prepared by mixing the sol precursor, the water and the organic solvent. In an embodiment of the present invention, when the catalyzed sol is a catalyzed silica sol, the catalyzed silica sol in step 1) above may be prepared by mixing a silica sol and a base catalyst, and here, the silica sol may be prepared by mixing a silica precursor, water, and an organic solvent. In addition, the silica sol may be hydrolyzed in a low pH in order to facilitate the gelation, and in this case, an acid catalyst may be used in order to reduce the pH.

The silica precursor, which can be used to prepare the silica sol, may be a silicon-containing alkoxide-based compound, and particularly, tetraalkyl silicate such as tetramethyl orthosilicate (TMOS), tetraethyl orthosilicate (TEOS), methyl triethyl orthosilicate, dimethyl diethyl orthosilicate, tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, tetradodecyl orthosilicate, or the like. Among these, the silica precursor according to an embodiment of the present invention may be tetraethyl orthosilicate (TEOS).

The silica precursor may be used in an amount so that a content of silica ($SiO_2$) contained in the silica sol is 3 wt % to 30 wt %. If the content of the silica is less than 3 wt %, a content of the silica aerogel in the finally prepared blanket is too low to cause a problem that a desired level of a thermal insulation effect is not expected. If the content of the silica exceeds 30 wt %, there is a worry that the silica aerogel is excessively formed to deteriorate mechanical properties of the blanket, particularly, flexibility of the blanket.

In addition, an organic solvent which can be used to prepare the sol of the present invention can be used without limitation as long as the organic solvent has excellent compatibility with a sol precursor and water. Particularly, a polar organic solvent may be used and more particularly, alcohol may be used. Here, the alcohol may be, particularly, monohydric alcohol such as methanol, ethanol, isopropanol and butanol; polyhydric alcohol such as glycerol, ethylene glycol, propylene glycol, diethylene glycol, dipropylene glycol, and sorbitol, and any one of the above materials or a mixture of two or more thereof may be used. Among these, when considering miscibility with water and aerogel which is subsequently prepared, monohydric alcohol having 1 to 6 carbon atoms such as methanol, ethanol, isopropanol, butanol, and the like may be used.

The organic solvent as described above may be used in a proper content considering the content of the finally prepared aerogel.

The silica sol according to an embodiment of the present invention may contain the silica precursor and the water at a molar ratio of 1:4 to 1:1. Also, the silica precursor and the organic solvent may be contained at a weight ratio of 1:2 to 1:9, and preferably may be contained at a weight ratio of 1:4 to 1:6. When the silica precursor satisfies the molar ratio or the weight ratio above with the water and the organic solvent, the production yield of the aerogel may increase, thereby having an improvement effect in terms of the thermal insulation performance.

In addition, in the sol according to an embodiment of the present invention, the acid catalyst, which may be further included, can be used without limitation as long as the acid catalyst makes the pH become 3 or less, for example, hydrochloric acid, nitric acid, or sulfuric acid may be used. In this case, the acid catalyst may be added in an amount so that the sol has a pH of 3 or less, and may be added in an aqueous solution in which the acid catalyst is dissolved in an aqueous solvent.

Furthermore, the base catalyst, which can be used in the catalyzed sol according to an embodiment of the present invention, may include: an inorganic base such as sodium hydroxide or potassium hydroxide; or an organic base such as ammonium hydroxide. Particularly, the base catalyst may be at least one selected from the group consisting of sodium hydroxide (NaOH), potassium hydroxide (KOH), calcium hydroxide ($Ca(OH)_2$), ammonia ($NH_3$), ammonium hydroxide ($NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino)ethanol, N-methyl diethanolamine, dimethylaminoethanol, diethylaminoethanol, nitrilotriethanol, 2-(2-aminoethoxy)ethanol, 1-amino-2-propanol, triethanolamine, monopropanolamine, dibutanolamine, and preferably, may be sodium hydroxide, ammonia, ammonium hydroxide, or a mixture thereof.

The base catalyst may be contained in an amount so that the sol has a pH of 7 to 11. When the pH of the sol is out of the above range, the gelation of step 2) which will be described below may not be easily performed, or a gelation rate may be too slow to deteriorate processability. Also, since the base is precipitated when being added in a solid phase, the base may be added, particularly, in an aqueous solvent or in a solution phase that is diluted with the above-mentioned organic solvent. In this case, a dilution ratio of the base catalyst to the organic solvent, particularly, the alcohol may be 1:4 to 1:100 based on a volume.

Additives may further be added to the catalyzed sol as necessary, and in this case, all the known additives, which can be added during producing aerogel, can be applied as the additives, and for example, additives such as an opacifying agent and a fire retardant material may be used.

The blanket base may be added in a proper form which is easy to be added according to the shape of the reaction container. Specifically, in step 2) which will be described below, the blanket base, which is wound around a bobbin in a roll shape in order to facilitate the rotation, may be added to the reaction container. In this case, the bobbin may be an axis which can rotate the blanket base, and anything can be applied as long as the blanket base may be wound around. For example, a prismatic pillar having a size, which can be put into the reaction container, may be used, and preferably a cylindrical pillar. In addition, according to an embodiment of the present invention, the bobbin may include a winding rod around which the blanket base can be wound in a roll shape and a support plate which supports a side portion so that the blanket base, which is wound around the winding rod, does not deviate during rotating. In this case, the winding rod may preferably have multiple hollows in order that the catalyzed sol is easily impregnated even into an inner portion of the blanket base. Meanwhile, the support plate may be used as a mesh type or may include multiple hollows in order that the catalyzed sol can flow into the side portion of the blanket base. Any material may be used as the material of the bobbin as long as it has sufficient strength which can support the blanket, and particularly stainless steel, PE, PP, Teflon, etc. may be used.

After the blanket base is wound around the bobbin, this may be added to the reaction container and fixed thereto. Here, the bobbin can be fixed at any position of the reaction container, but the bobbin may preferably be fixed at the center of the reaction container since a lot of blanket bases are added into the reaction container with the same volume, thereby improving production efficiency. In addition, the bobbin may be positioned so that the major axis of the bobbin is in parallel with the major axis of the reaction container.

Also, the blanket base may be particularly a porous base material in terms of improving heat insulating properties of the aerogel blanket. When the porous blanket base is used, the catalyzed sol may be easily penetrated into the base to uniformly form the aerogel inside the blanket base, and thereby a large amount of aerogel may be firmly coupled on the surface of the blanket base. Thus, the produced aerogel blanket may have excellent thermal insulation properties. Even if an external force such as vibration is applied to the aerogel blanket, the separation of the aerogel particles is minimized, thereby exhibiting the effect of suppressing changes in physical properties such as thermal conductivity of the aerogel blanket even when an external force such as vibration is applied.

The blanket base may be a film, a sheet, a net, fiber, foam, nonwoven fabric, or a laminate having two or more layers thereof. Also, surface roughness may be formed or patterned on the surface of the blanket according to application of the blanket. More particularly, the blanket base may include a space or pore, through which the aerogel is easily injected into the blanket base, thereby improving thermal insulation performance. Further, it may be preferable that the blanket base has a low thermal conductivity.

Particularly, the blanket base may be polyamide, polybenzimidazole, polyaramid, an acrylic resin, a phenol resin, polyester, polyether ether ketone (PEEK), polyolefin (for example, polyethylene, polypropylene, or a copolymer thereof), cellulose, carbon, cotton, wool, hemp, non-woven fabric, glass fiber, or ceramic wool, and more particularly, the blanket base may be glass fiber (glass felt).

The reaction container may be a reaction container for performing the gelation, and a container having any shape such as prismatic or cylindrical may be used as long as the container forms a space so that the blanket base impregnated with the catalyzed sol can rotate, but preferably a cylindrical reaction container may be used in order to facilitate the addition of the blanket base which is wound in a roll shape and facilitate the rotation of the blanket base impregnated with the catalyzed sol during the gelation reaction.

In step 1) above, when the catalyzed sol is added, the blanket base may be slightly pressed to be fully impregnated in order to well couple the blanket base and the catalyzed sol. Thereafter, the blanket base may be pressed to a certain thickness with a constant pressure to remove excessive sol, thereby reducing drying time. In another embodiment, when the catalyzed sol is added to the reaction container, the blanket base is fully impregnated, and thus the liquid level in the reaction container does not change any more, the remaining sol may be recovered, and in this case, the remaining sol may be recovered by opening a drain valve connected to the reaction container.

In addition, the catalyzed sol and the blanket base may be added, respectively, in an amount to be 1 to 100% of the volume inside the reaction container, particularly, the inner volume of the reaction container, and in order to reduce the gelation time in step 2) and form aerogel uniformly inside the blanket base, the catalyzed sol and the blanket base may be added, respectively, to be preferably 1 to 60% of the volume of the reaction container, more preferably, 10 to 60%, and even more preferably 30 to 60%.

According to an embodiment of the present invention, the catalyzed sol may be added in an amount of 80 to 120%, and particularly, 90 to 110% with respect to the volume of the blanket base. In addition, the addition amount of the blanket base and the catalyzed sol may preferably satisfy the addition ratio between each other under the condition satisfying the addition amount to the reaction container as above. When the catalyzed sol satisfies the addition ratio (addition amount) to the volume of the blanket base, since the catalyzed sol is more uniformly impregnated into the blanket base, the aerogel blanket produced may have more uniform physical properties and a large amount of aerogel may be firmly coupled on the surface of the blanket base, and since the catalyzed sol can be fully impregnated into the blanket base, the loss of the raw material may be prevented and a problem of gelating the catalyzed sol alone may be prevented.

Step 2)

Step 2) above is for preparing a wet-gel blanket composite (wet-gel blanket), and may be carried out by gelating the blanket base impregnated with the catalyzed sol while rotating the blanket base.

The method for producing an aerogel blanket according to an embodiment of the present invention may produce the aerogel blanket in which the separation of the aerogel particles by vibration is suppressed because the blanket base impregnated with the catalyzed sol is gelated by rotating the blanket base and thus the aerogel is formed more uniformly in the blanket base during the gelation as well as the aerogel is firmly coupled on the surface of the blanket base.

The rotation of the blanket base impregnated with the catalyzed sol may be performed by using any method and device as long as they can make the blanket base rotate during gelating in the reaction container, and particularly, in the case where the blanket base is added and fixed in a state in which the blanket base is wound around the bobbin in step 1) above, the blanket base impregnated with the catalyzed sol is present in the reaction container while being wound around the bobbin, and thus rotating the bobbin may make the blanket base impregnated with the catalyzed sol rotate.

In the present invention, the gelation may be to form a network structure from the catalyzed sol, and the network structure may show a planar net shape structure in which particular polygons having one or more types of atom arrangements are connected, or a structure in which vertices, edges, faces, etc. of a particular polyhedron are shared to form a three-dimensional skeleton structure.

According to an embodiment of the present invention, the gelation reaction may be performed after the reaction container, in which the catalyzed sol and the blanket base is added, is sealed. In addition, according to an embodiment of the present invention, the major axis may be disposed in a transverse direction, i.e., a horizontal direction and be rotated. If the reaction container (main body) is a cylindrical reaction container, the cylindrical reaction container can be rotated while lying. That is, the rotation axis of the reaction container of the present invention may be a horizontal direction, but is not limited thereto.

A type of a production device of an aerogel blanket is not limited as long as the production device includes the reaction container (main body) and can rotate the blanket base impregnated with the catalyzed sol present in the reaction container, and any known device may be used as long as it can rotate the blanket base. Particularly, if a device can fix the position of the bobbin in the reaction container and make the fixed bobbin rotate, any known device may be used. An embodiment of the production device of the aerogel blanket which may be applied in the present invention will be described later.

In addition, after completing step 1) above, step 2) above may be initiated, and step 1) above and step 2) above may be sequentially carried out.

According to another embodiment of the present invention, before completing step 1) above, step 2) above may be initiated. Like this, if step 2) above is initiated before completing step 1) above, all the catalyzed sol may be added into the blanket base until the gelation is completed, specifically, before the gelation is completed.

According to an embodiment of the present invention, the rotation speed of step 2) above may be applied without limitation as long as it can uniformly form the aerogel in the blanket. For example, the gelation may be performed by rotating at a rotation speed of 1 rpm to 300 rpm, preferably 5 rpm to 150 rpm, 5 rpm to 100 rpm, and more preferably, 10 rpm to 30 rpm. When the reaction container satisfies the above range of the rotation speed, the sol may be uniformly impregnated in the blanket base, thereby forming the aerogel more uniformly during the gelation and a large amount of aerogel being firmly coupled on the surface of the blanket base, and thus very uniform thermal conductivity may be secured in the entire aerogel blanket, and there is an advantage that the stability of the reaction container and a device of rotating the blanket base is improved to thus improve the stability of the production process of the aerogel blanket.

In the present invention, the aerogel blanket is produced by adding all the catalyzed sol and the blanket base in the reaction container to gelate, and thus it has an advantage that space in use may be significantly saved in the production compared to a roll-to-roll method since a separate moving element such as a conveyer belt is not required. In addition, when as in the roll-to-roll method, the blanket base is disposed on the moving element and the catalyzed sol is applied on the blanket base and gelated while continuously moving the moving element, the gelation is not performed all over the blanket base at the same time and the gelation can only be performed sequentially over time while continuously supplying the blanket base and the catalyzed sol, and thus there occurs a problem that it takes a significantly longer time to gelate compared to the gelation process according to an embodiment of the present invention even if the blanket base having the same thickness and length is used. In particular, there remarkably shows a problem in that as the blanket base is longer, the gelation process time is longer in order to fully gelate the entire blanket base. According to an embodiment of the present invention, the production time may be significantly reduced because the gelation of the sol is performed all over the blanket base at the same time. In addition, since the length and thickness of the blanket base do not have an effect on the gelation time, even if a long blanket base is used, the production time may be significantly reduced, thereby maximizing process efficiency.

Also, according to an embodiment of the present invention, the gelation is performed while rotating the reaction container, a centrifugal force and a centripetal force act, and thus this method can produce an aerogel blanket in which the aerogel is dispersed more uniformly compared to the roll-to-roll method in which the reaction container is not rotated or the gelation is performed on the moving element. Therefore, the thickness of the produced aerogel blanket is the same as or extremely similar to the thickness of the blanket base, and there is an effect of excellent thermal insulation properties.

Moreover, the production method according to an embodiment of the present invention may perform the aging by a process in which the wet-gel blanket composite is left at an appropriate temperature to complete a chemical change, and the aging may more stably form the formed network structure, thereby enhancing the mechanical stability of the aerogel blanket of the present invention.

The aging of the present invention has an effect of further facilitating the maintenance of the pore structure in a rapid drying process to be subsequently performed by adding a solution, in which a base catalyst such as sodium hydroxide (NaOH), potassium hydroxide (KOH), ammonium hydroxide (NH$_4$OH), triethylamine, or pyridine is diluted in an organic solvent in a concentration of 1% to 10%, to maximally induce a Si—O—Si bond in the aerogel and thus make the network structure of the silica gel more stable. In this case, the organic solvent may be the aforementioned alcohol (a polar organic solvent), and particularly, may include ethanol.

In addition, the aging is to be carried out in an appropriate temperature range in order to enhance an optimal pore structure, and the aging of the present invention may be carried out by leaving at a temperature of 30° C. to 70° C. for 1 hour to 10 hours. If the aging temperature is lower than 30° C., the aging time may be excessively prolonged to lead to an increase in the entire process time, thereby reducing productivity. If the aging temperature is higher than 70° C., the temperature is over the boiling point of ethanol, and thus the loss of the solvent by evaporation may be increased, thereby increasing raw material costs.

Moreover, according to an embodiment of the present invention, surface-modifying may further be performed in order to produce a hydrophobic aerogel blanket.

When a hydrophilic functional group present on the aerogel surface is substituted with a hydrophobic functional group, during the drying of the aerogel, the contraction of the pores by the surface tension of the solvent may be minimized due to the repulsive forces between the hydrophobic functional groups. The dried aerogel maintains a low thermal conductivity immediately after drying, but a hydroxy functional group present on the surface of the aerogel, for example, when the aerogel is silica aerogel, a hydrophilic silanol group (Si—OH) present on the silica surface absorbs water in air, thereby increasing a thermal conductivity gradually. Therefore, in order to maintain a low thermal conductivity, there is a need to modify the aerogel surface to hydrophobicity.

Thus, the surface-modifying according to an embodiment of the present invention may be performed by a surface-modifying agent including a polar solvent and an organosilane compound.

As the polar solvent, methanol, ethanol, isopropyl alcohol, or the like may be used, and as the organosilane compound, trimethylchlorosilane, (TMCS), hexamethyldisilazane (HMDS), methyltrimethoxysilane, trimethylethoxysilane, ethyltriethoxysilane, phenyltriethoxysilane, or the like may be used, and particularly, the HMDS may be used.

In the surface-modifying, it is preferable that the solvent is mixed in a volume ratio of 1-10 with respect to the gel, and the organosilane compound is mixed in a volume ratio of 0.1-10 with respect to the gel. When the volume ratio of the organosilane compound is less than 0.1, the reaction time is excessively prolonged and the surface-modifying efficiency may be reduced. When the volume ratio of the organosilane compound is greater than 10, there is a problem of cost increase, and the unreacted surface-modifying agent may cause contraction during drying.

In addition, according to an embodiment of the present invention, the aging and the surface-modifying may be performed in a separate reaction container after recovering the silica wet-gel blanket which is completely gelated, or may be performed inside the reaction container in which the gelation was performed, and the aging and the surface-modifying may preferably be performed in the above performed reaction container in terms of the efficiency of the process and the simplification of equipment. In addition, when the aging and the surface-modifying are performed in the reaction container in which the gelation was performed, the wet-gel blanket composite prepared in step 2) above can rotate, and when the aging and the surface-modifying are performed while the wet-gel blanket composite is rotating, the aging solvent and the surface-modifying agent may be better penetrated, and after the aging solvent and the surface-modifying agent are penetrated, dispersion thereof may be performed better in the wet-gel blanket composite, and thus there is an advantage that aging efficiency and surface-modifying efficiency are significantly improved.

After performing the above surface-modifying step, a hydrophobic wet-gel blanket composite may be obtained.

In addition, the wet-gel blanket composite according to an embodiment of the present invention may be subjected to drying to prepare an aerogel blanket.

Meanwhile, the production method according to an embodiment of the present invention may further perform the step of washing before the drying. The washing is for obtaining a highly pure hydrophobic aerogel blanket by removing impurities (sodium ions, unreactants, byproducts, etc.) generated during reaction and residual ammonia which can generate ammonium carbonate salts by reacting $CO_2$ during a supercritical drying, and may be performed with a dilution process or an exchange process using a nonpolar organic solvent.

The drying according to an embodiment of the present invention may be carried out by a process of removing the solvent while maintaining the pore structure of the aged gel as it is, and the drying may be carried out by a process of supercritical drying or atmospheric pressure drying.

The supercritical drying process may be carried out by using supercritical carbon dioxide. Carbon dioxide is in a gas state at room temperature and atmospheric pressure, but if the temperature and pressure are above a limit of certain temperature and high pressure, which is referred to as a supercritical point, the evaporation process does not occur, and thus the carbon dioxide becomes a critical state in which gas and liquid cannot be distinguished, and carbon dioxide in this critical state is referred to as supercritical carbon dioxide.

The supercritical carbon dioxide has properties in which a density of the molecule is similar to that of a liquid, but a low viscosity is similar to that of a gas, and has a fast diffusion speed and a high thermal conductivity, and thus drying efficiency may be high and a drying process time may be reduced.

Specifically, in the supercritical drying process, performed is a solvent substitution process in which the aged wet-gel blanket is added in a supercritical drying reactor, and then $CO_2$ in liquid form is filled therein and an alcohol solvent in the wet-gel is substituted with $CO_2$. Thereafter, the temperature is elevated to 40° C. to 70° C. at a constant heating rate, particularly, at a rate of 0.1° C./min to 1° C./min, and then a pressure equal to or higher than the pressure at which carbon dioxide becomes supercritical, particularly, a pressure of 100 bar to 150 bar is maintained, and carbon dioxide in supercritical state is maintained for a certain time, particularly, for 20 minutes to 1 hour. In general, carbon dioxide becomes supercritical at a temperature of 31° C. and a pressure of 73.8 bar. Carbon dioxide is maintained at a constant temperature and pressure, at which carbon dioxide becomes supercritical, for 2 hours to 12 hours, more particularly, for 2 hours to 6 hours, and then the pressure is gradually removed to complete the supercritical drying process, thereby producing an aerogel blanket.

In addition, the atmospheric pressure drying process may be performed according to a typical method such as hot air drying or IR drying under a temperature of 70° C. to 200° C. and atmospheric pressure (1±0.3 atm).

As a result of the drying process as described above, a blanket containing porous aerogel having nano-sized pores may be produced. In particular, the silica aerogel according to an embodiment of the present invention has high hydrophobicity as well as excellent physical properties, particularly, low tap density and high porosity, and the silica aerogel-containing blanket including the silica aerosol has a low thermal conductivity and excellent mechanical flexibility.

In addition, before or after the drying process, a pressing process for adjusting the thickness and uniformizing the internal structure and surface shape of the blanket, a molding process for having an appropriate shape or morphology according to application of the blanket, or a lamination process for laminating a separate functional layer, and the like may be further performed.

FIG. 1 illustrates an embodiment of an aerogel blanket production device used in an embodiment of a method for producing an aerogel blanket according to an embodiment of the present invention. Referring to FIG. 1, the production device includes a bobbin 100 around which a blanket is wound, and a main body 200 equipped with a gelling tank 210 accommodating the bobbin 100, a driving member 300 configured to rotate the bobbin 100 accommodated in the gelling tank 210, and a catalyzed sol supply member 400 configured to inject a catalyzed sol into the gelling tank 210, an aging member (not shown) configured to inject an aging solution into the gelling tank 210, a surface-modifying agent member (not shown) configured to inject a surface-modifying agent into the gelling tank 210, and a drying member (not shown) configured to increase the temperature of the gelling tank 210 to dry the blanket.

Here, the blanket may mean a blanket base before the catalyzed sol is added, a blanket base impregnated with the catalyzed sol, and/or a wet-gel blanket after the gelation, and may be properly interpreted according to the state of the blanket base for each step.

Bobbin

The bobbin is for winding the blanket in a roll shape, and includes a winding rod around which the blanket is wound in a roll shape and a support plate which is coupled to each end of the winding rod and supports a side portion of the blanket which is wound around the winding rod.

The winding rod has a cylindrical shape with a hollow that is penetrated in a longitudinal direction, and the blanket in a long sheet shape is wound around an outer surface of the winding rod in a roll shape.

Meanwhile, an outer portion of the blanket wound around the winding rod can be stably gelated because the catalyzed sol can be impregnated rapidly, but an inner portion of the blanket has a problem that it takes a long time to impregnate the catalyzed sol. To prevent this, an outer circumferential surface of the winding rod includes a plurality of connection holes which are connected to the hollow.

That is, the winding rod has a hollow therein so that the catalyzed sol injected into the gelling tank is allowed to flow into the hollow, and has a plurality of connection holes, through which the silica sol flowing into the hollow is discharged to the outside of the winding rod so as to be impregnated into the inner portion of the blanket wound around the winding rod. Thus, the inner portion and the outer portion of the blanket may be gelated at the same time by impregnating the silica sol. Therefore, a time taken to gelate the blanket may be significantly reduced to uniformly gelate the entire blanket.

Meanwhile, each of the plurality of connection holes has a diameter of 3 mm to 5 mm, and the plurality of connection holes are defined at regular intervals in the outer circumferential surface of the winding rod. Thus, the catalyzed sol may be uniformly supplied to the entire blanket wound around the outer circumferential surface of the winding rod to uniformly gelate the entire inner portion of the blanket.

The support plate is configured to support the blanket wound around the winding rod so that the blanket is not irregularly wound. The support plate has a disc shape and is coupled to each end of the winding rod to support the side portion of the blanket wound around the winding rod.

The support plate includes a coupling groove, to which the end of the winding rod is coupled, and a coupling hole defined in a bottom surface of the coupling groove. That is, the support plate may be coupled to the end of the winding rod through the coupling groove.

Meanwhile, a plurality of opening holes may be defined in the support plate. The catalyzed sol may flow into the side portion of the blanket wound around the winding rod through the plurality of opening holes, and thus, the side portion of the blanket may be stably gelated.

Therefore, the bobbin includes the winding rod and the support plate to thus wind the blanket in a roll shape.

Main Body

The main body is configured to install the gelling tank in which the bobbin is accommodated and includes the gelling tank and a first installation member on which the gelling tank is installed.

The gelling tank is configured to gelate the blanket accommodated in the bobbin and includes a gelling chamber that is provided inside the gelling tank to accommodate the bobbin, a discharge part provided at an outer lower end of the gelling tank and connected to the gelling chamber, and an inflow part provided at an outer upper end of the gelling tank and connected to the gelling chamber.

Particularly, the gelling chamber of the gelling tank has a U-shaped cross-sectional shape of which an upper portion is opened by a cover, and a lower portion has a curvature corresponding to the blanket wound around the winding rod. Thus, when the silica sol flows into the gelling chamber, contact force between the silica sol and the blanket may increase to improve gelation of the blanket.

Meanwhile, the gelling tank includes a rotation member provided on both wall surfaces of the gelling chamber and coupled to both ends of the bobbin so that the bobbin is rotatably installed in the gelling chamber.

The rotation member is rotatably installed in a through-hole defined in each of both the wall surfaces of the gelling chamber so that the end of the bobbin accommodated in the gelling chamber is capable of transmitting power.

For example, a coupling protrusion having a straight-line shape is disposed on one surface of the rotation member, and a coupling groove having a straight-line shape and coupled to the coupling protrusion is defined in the end of the bobbin. That is, when the rotation member rotates, the bobbin may rotate in the same direction through the coupling of the coupling protrusion and the coupling groove. As a result, the bobbin may be rotatably installed inside the gelling tank.

Meanwhile, the main body further comprises a second installation member 230 on which the catalyzed sol supply member is installed. The second installation member includes a bottom piece 231, an installation frame 232 installed on an upper portion of the bottom piece 231 so that the catalyzed sol supply member is disposed higher than that gelling tank, and a stair 233 installed on an end of one side of the bottom piece.

The gelling tank may include a rotation handle coupled to the other rotation member provided in the gelling tank to allow the bobbin to rotate, and the rotation handle may manually rotate the bobbin at the outside.

Meanwhile, the aging member, a surface-modifying member, and the drying member are further installed on the installation frame of the second installation member.

Driving Member

The driving member is configured to rotate the bobbin accommodated in the gelling tank. The driving member is connected to the other rotation member provided in the gelling tank to transmit power. That is, when the rotation member rotates, the driving member may be interlocked with the rotation member to rotate the bobbin accommodated in the gelling tank.

Catalyzed Sol Supply Member

The catalyzed sol supply member is configured to gelate the blanket by injecting the silica sol into the gelling tank to impregnate the blanket wound around the bobbin, and is installed on the installation frame to supply the catalyzed sol into the gelling chamber through the inflow part of the gelling tank.

Aging Member

The aging member is configured to inject the aging solution to the gelling tank to age the blanket wound around the bobbin, and is installed on the installation frame to supply the aging solution into the gelling chamber through the inflow part of the gelling tank.

Surface-Modifying Member

The surface-modifying member is configured to inject the surface-modifying agent into the gelling tank so as to modify the surface of the blanket wound around the bobbin, and is installed on the installation frame to supply the surface-modifying agent into the gelling chamber through the inflow part of the gelling tank.

Drying Member

The drying member is configured to supply high-temperature hot air into the gelling tank so as to dry the blanket wound around the bobbin, and is installed on the installation frame and elevates a temperature of the gelling tank to dry the blanket accommodated in the gelling tank.

Thus, in the aerogel blanket production device according to an embodiment of the present invention, the time taken to produce the aerogel blanket may be significantly reduced, and the productivity of the aerogel blanket may be significantly improved to mass-produce the aerogel blanket.

Particularly, the aerogel blanket production device according to an embodiment of the present invention may induce the stable gelation regardless of a thickness and length of the blanket as the blanket rotates. Since the bobbin rotates, the entire blanket wound around the bobbin may be uniformly gelated. Also, since only the bobbin rotates without rotating the gelling tank, the gelling tank is not limited in shape. Also, since the gelling chamber of the gelling tank has the 'U'-shaped cross-sectional shape, the blanket wound around the bobbin may be more effectively gelated.

In addition, according to an embodiment of the present invention, the aerogel blanket production device includes the bobbin around which the blanket is wound, and the bobbin may include the winding rod and the support plate.

Here, the outer circumferential surface of the winding rod may include a fixing clip into which a winding start point of the blanket is fitted and fixed.

That is, the fixing clip has a pin shape having elastic restoring force and has one end fixed to the outer circumferential surface of the winding rod and the other end that is elastically supported on the outer circumferential surface of the winding rod. Therefore, when the start point of the blanket is inserted between the other end of the fixing clip and the winding rod, the blanket may be fixed to the start point of the winding rod by the elastic force of the fixing clip. As a result, the blanket may be easily wound around the outer circumferential surface of the winding rod.

MODE FOR CARRYING OUT THE INVENTION

Examples

Hereinafter, embodiments of the present invention will be described in detail so that a person with ordinary skill in the art can easily practice the present invention. The present invention may, however, be embodied in different forms and should not be construed as limited to the embodiments set forth herein.

Preparation Example: Preparation of Silica Sol and Catalyst Solution

Tetraethyl orthosilicate (TEOS) and water were mixed at a molar ratio of 1:4, ethanol having a weight ratio of 1:5 with TEOS was added thereto to prepare a silica sol. Hydrochloric acid is added so that the silica sol has a pH of 3 or less to promote the hydrolysis. With respect to 100 parts by weight of the silica sol, 0.2 parts by weight of $TiO_2$, an opacifying agent, and 0.2 parts by weight of Ultracarb (LKAB Inc.), a fire retardant material, were mixed and stirred for 30 minutes to prepare the silica sol, and separately 1 vol % of an ammonia ethanol solution (base catalyst solution) was prepared. The silica sol and the base catalyst solution were mixed in a volume ratio of 9:1 to prepare a catalyzed sol.

Example 1

A bobbin around which 10 T (10 mm) glass fiber was wound was fixed in a reaction container. The catalyzed sol prepared in Preparation Example above was added to the reaction container and gelation was performed while rotating the bobbin around which the glass fiber was wound. Here, an addition rate of the catalyzed sol was adjusted to allow all the catalyzed sol to be added before completing the gelation. When the fiber was fully impregnated so that a liquid level in the reaction container does not change any more, the remaining sol was recovered by opening a drain valve coupled to the reaction container. After 30 minutes, when the gelation was completed, an aging solution was added to the reaction container, and the aging was performed while rotating the bobbin. Here, 5 vol % of an ammonia ethanol diluted solution was used as the aging solution to age at 60° C. for 1 hour. When the aging is completed, the aging solution was recovered by opening the drain valve. Then, a surface-modifying solution was added to the reaction container to surface-modify while rotating the bobbin, and after completing the surface-modifying, the surface-modifying solution was recovered. As the surface-modifying solution, 10 vol % of hexamethyldisilazane (HMDS) ethanol diluted solution was used and added in an amount with the same volume ratio as the wet-gel blanket composite.

The surface-modifying (hydrophobization) was performed at 60° C. for 4 hours. After completing the surface-modifying reaction, the wet-gel blanket was added to a supercritical extractor, $CO_2$ was injected thereto, the temperature in the extractor was heated to 60° C. for 1 hour, and a supercritical drying was performed at 60° C. and 150 bar. The hydrophobic silica aerogel blanket, in which the supercritical drying was completed, was subjected to an atmospheric pressure drying in a 200° C. oven for 2 hours to completely remove a remaining salt and water, thereby producing a hydrophobic silica aerogel blanket.

Example 2

A bobbin around which 10 T (10 mm) glass fiber was wound was fixed in a reaction container. Trimethylethoxylsilane having the same moles as those of tetraethyl orthosilicate (TEOS) was added as a surface-modifying agent to the catalyzed sol prepared in Preparation Example above. The sol was added to the reaction container and gelation was performed while rotating the bobbin around which the glass fiber was wound. Here, an addition rate of the catalyzed sol was adjusted to allow all the catalyzed sol to be added before completing the gelation. When the fiber was fully impregnated so that a liquid level in the reaction container does not change any more, the remaining sol was recovered by opening a drain valve coupled to the reaction container. After 30 minutes, when the gelation was completed, the aging was performed without a separate aging solution at 60° C. for 20 hours.

The aged wet-gel blanket was added to a supercritical extractor, $CO_2$ was injected thereto, the temperature in the extractor was heated to 60° C. for 1 hour, and a supercritical drying was performed at 60° C. and 150 bar. The hydrophobic silica aerogel blanket, in which the supercritical drying was completed, was subjected to an atmospheric pressure drying in a 200° C. oven for 2 hours to completely remove a remaining salt and water, thereby producing a hydrophobic silica aerogel blanket.

Figure 2:
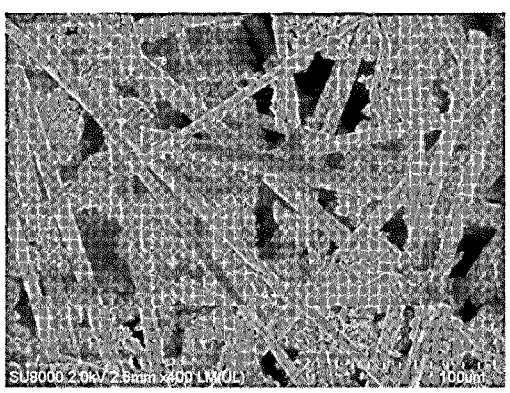
FIG. 2 is SEM photographs of an aerogel blanket produced in Example 2, and the left is magnified by a factor of 400, and the right is magnified by a factor of 5,000.
Figure 2:
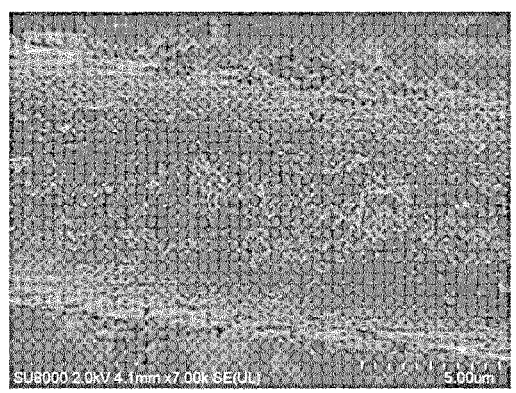

FIG. 2 shows scanning electron microscope (SEM) photographs of the prepared silica aerogel blanket.

Example 3

A bobbin around which 10 T (10 mm) glass fiber was wound was fixed in a reaction container. The catalyzed sol prepared in Preparation Example above was added to the reaction container and gelation was performed while rotating the bobbin around which the glass fiber was wound. Here, an addition rate of the catalyzed sol was adjusted to allow all the catalyzed sol to be added before completing the gelation. When the fiber was fully impregnated so that a liquid level in the reaction container does not change any more, the remaining sol was recovered by opening a drain valve coupled to the reaction container. After 30 minutes, when the gelation was completed, an aging solution was added to the reaction container, and the aging was performed while rotating the bobbin.

The aged wet-gel blanket was added to a supercritical extractor, $CO_2$ was injected thereto, the temperature in the extractor was heated to 60° C. for 1 hour, and a supercritical drying was performed at 60° C. and 150 bar. The silica aerogel blanket, in which the supercritical drying was completed, was subjected to an atmospheric pressure drying in a 200° C. oven for 2 hours to completely remove a remaining salt and water, thereby producing a hydrophilic silica aerogel blanket.

Comparative Example 1

10 T glass fiber was loaded on a conveyor belt, and the belt was operated at a rate of 0.15 m/min to move the glass fiber. The catalyzed sol prepared in Preparation Example above was sprayed at a rate of 1.2 L/min through a nozzle installed at a front end of the conveyor belt so as to be impregnated into the moving glass fiber. The fiber impregnated with the sol was gelated while moving on the belt for 20 minutes, and when the gelation was completed, a wet-gel blanket was wound around the bobbin located at a rear end of the belt. Thereafter, the silica aerogel blanket was produced by the same method as in Example 1.

Figure 3:
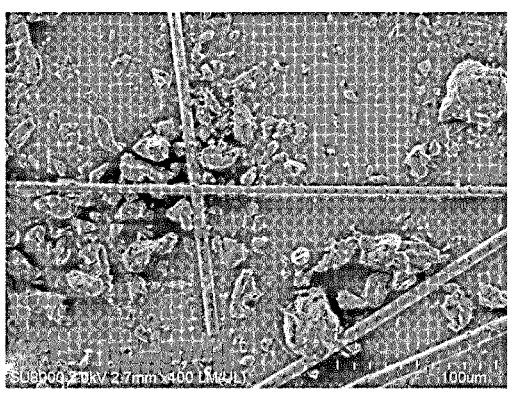
FIG. 3 is SEM photographs of an aerogel blanket produced in Comparative Example 1, and the left is magnified by a factor of 400, and the right is magnified by a factor of 5,000.
Figure 3:
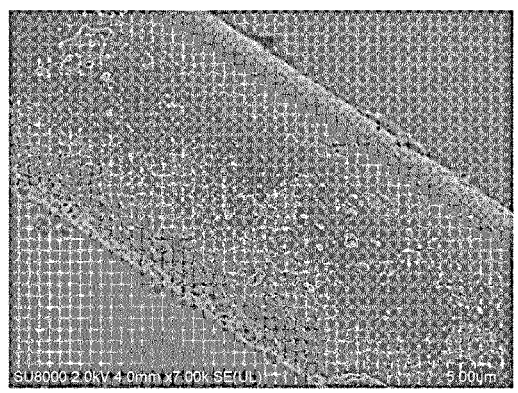

FIG. 3 shows SEM photographs of the prepared silica aerogel blanket.

Experimental Example

1) Measurement of Number of Particles in Air after Vibration

The silica aerogel blankets produced in Examples 1 to 3 and Comparative Example 1 were used to make each sample having a size of 610 mm×914 mm. The sample was mounted on a vibration generating device which is manufactured for ourselves, frequency and time shown in Table 1 below were set, and vibration was applied. After vibration was applied, the number of particles scattered in air was measured for 1 minutes by using particle counter equipment (Fluke-985 from Fluke Corp.). The vibration test was performed in a hermetic room having a size of about 12 m².

2) Measurement of Thermal Conductivity at Room Temperature (mW/mK)

From the aerogel blanket produced in each of Examples and Comparative Examples, five samples, each of which has a size of 30 cm×30 cm, per each blanket were prepared, and the thermal conductivity at room temperature (20±5° C.) before and after vibration in 1) above of each sample was measured by using HFM 436 Lambda equipment from NETZSCH. A rate of increase in thermal conductivity after vibration was calculated by using Equation 1 below.

[Equation 1]

Rate of increase in thermal conductivity (%) =

$$\frac{\text{thermal conductivity after vibration} - \text{thermal conductivity before vibration}}{\text{thermal conductivity before vibration}} \times 100$$

3) Rate of Weight Reduction

Measured was a weight before and after the vibration in 1) above of each sample having a size of 610 mm×914 mm made by using silica aerogel blankets produced in Examples 1 to 3 and Comparative Example 1. A rate of weight reduction after the vibration was calculated by using Equation 2 below.

Rate of weight reduction (%)=(weight after vibration−weight before vibration)/weight before vibration×100 [Equation 2]

TABLE 1

| Experiment | Sample | Vibration condition (frequency, time) | Number of particles in air after vibration (per ft³) | | | | | Thermal conductivity at room temperature (mW/mK) | | Rate of increase in thermal conductivity (%) | Rate of weight reduction (%) |
|---|---|---|---|---|---|---|---|---|---|---|---|
| | | | to 1.0 μm | to 2.0 μm | to 5.0 μm | to 10.0 μm | Total | Before vibration | After vibration | | |
| 1 | Example 1 | 24 Hz, 6 hours | 55520 | 26220 | 3830 | 530 | 86100 | 17.39 | 17.63 | 1.38 | 0.22 |
| 2 | Example 2 | 24 Hz, 6 hours | 52510 | 23370 | 2620 | 340 | 78840 | 17.23 | 17.46 | 1.33 | 0.19 |
| 3 | Example 2 | 12 Hz, 6 hours | 41650 | 17300 | 1750 | 150 | 60850 | 17.78 | 17.95 | 0.96 | 0.14 |
| 4 | Example 2 | 6 Hz, 6 hours | 37910 | 14850 | 1060 | 70 | 53890 | 18.01 | 18.11 | 0.55 | 0.12 |
| 5 | Example 3 | 24 Hz, 6 hours | 52660 | 24140 | 2390 | 280 | 79470 | 18.67 | 18.94 | 1.45 | 0.19 |
| 6 | Comparative Example 1 | 24 Hz, 6 hours | 105890 | 66700 | 17900 | 3910 | 194400 | 17.56 | 18.19 | 3.59 | 1.02 |
| 7 | Comparative Example 1 | 12 Hz, 6 hours | 82260 | 48320 | 11150 | 2360 | 144090 | 17.88 | 18.34 | 2.57 | 0.64 |
| 8 | Comparative Example 1 | 6 Hz, 6 hours | 64330 | 31200 | 5060 | 980 | 101570 | 17.60 | 17.87 | 1.53 | 0.38 |
| 9 | Comparative Example 1 | 6 Hz, 3 hours | 59750 | 29460 | 4180 | 730 | 94120 | 18.54 | 18.82 | 1.51 | 0.24 |

In table 1 above, "to 1.0 μm" represents a particle diameter of 0.5 μm to 1.0 μm (exclusive of 0.5), "to 2.0 μm" represents a particle diameter of 1.0 μm to 2.0 μm (exclusive of 1.0), "to 5.0 μm" represents a particle diameter of 2.0 μm to 5.0 μm (exclusive of 2.0), and "to 10.0 μm" represents a particle diameter of 5.0 μm to 10.0 μm (exclusive of 5.0). In table 1 above, Experiments 2 to 4 were all performed by using samples prepared by using silica aerogel blanket produced in Example 2, and Experiments 6 to 9 were all performed by using samples prepared by using silica aerogel blanket produced in Comparative Example 1, and the difference in thermal conductivity at room temperature before the vibration corresponds to a deviation depending on a position in which samples were taken.

As can be seen in Table 1 above, in the case of the aerogel blankets in Examples 1 to 3, it can be seen that the rate of increase in thermal conductivity and rate of weight reduction of the aerogel blanket after the vibration under a vibration condition of 6 Hz and 6 hours, 12 Hz and 6 hours, and 24 Hz and 6 hours show significantly smaller values than those of Comparative Example 1. In addition, it can be seen that the number of aerogel particles separated from the aerogel blanket after the specific vibration of each aerogel blanket in Examples 1 to 3 also shows a significantly smaller number than that of the aerogel blanket in Comparative Example 1.

Further, the aerogel blanket in Comparative Example 1 shows a relatively low rate of weight reduction of 0.24 wt % under a vibration condition of 6 Hz and 3 hours, but the number of aerogel particles separated from the aerogel blanket after the vibration is 94,120 per ft³, which is large in number, and in this case, a relatively high rate of increase in thermal conductivity at room temperature is shown compared to the rate of weight reduction after the vibration. Thus, it can be confirmed that the effect that the number of separated aerogel particles has on the rate of increase in thermal conductivity at room temperature after the vibration of the aerogel blanket is greater than the effect that the rate of weight reduction after the vibration of the aerogel blanket has on the rate of increase in thermal conductivity at room temperature after the vibration of the aerogel blanket.

In this regard, referring to FIG. 2 illustrating SEM photographs of the aerogel blanket in Example 2 and FIG. 3 illustrating SEM photographs of the aerogel blanket in Comparative Example 1, it can be seen that the aerogel blanket in Example 2 has most aerogel, which is physically coupled to the blanket base (fiber), whereas the aerogel blanket in Comparative Example 1 has most aerogel which is individually and separately located at a space formed by the blanket base (fiber) and has a relatively very little amount of aerogel which is physically coupled to the blanket base.

Through the experimental example, it can be confirmed that in the case of the aerogel blankets in Examples 1 to 3, the aerogel is physically firmly coupled to the blanket base, and thus even after the vibration, the aerogel is separated less, whereas the aerogel blanket in Comparative Example 1 is not so, and thus there occurs a significantly difference in effect. These results may be analyzed in that the aerogel blanket of the present invention exhibits an excellent effect of a low rate of increase in thermal conductivity because the aerogel is more firmly coupled to the blanket base and even after the vibration, the aerogel is separated less.

DESCRIPTION OF THE SYMBOLS

| | |
|---|---|
| 100: Bobbin | 110: Winding rod |
| 120: Support plate | 200: Main body |
| 210: Gelling tank | 212: Discharge part |
| 213: Inflow part | 214: Cover |
| 215: Rotation member | 216: Rotation handle |
| 220: First installation member | 230: Second installation member |
| 231: Bottom piece | 232: Installation frame |
| 233: Stair | 300: Driving member |
| 400: Catalyzed sol supply member | |

The invention claimed is:

1. An aerogel blanket comprising:
a blanket base;
aerogel coupled on the surface of the blanket base; and
aerogel being not directly in contact with the blanket base;
wherein the aerogel blanket has a number of aerogel particles separated from the aerogel blanket ranging from 13,600 to 90,000 per ft$^3$, when vibrating the aerogel blanket at a frequency of 1 Hz to 30 Hz for 2 hours to 10 hours.

2. The aerogel blanket of claim 1, wherein the aerogel blanket has a rate of increase in thermal conductivity after vibration of 1.5% or less, when vibrating the aerogel blanket at a frequency of 1 Hz to 30 Hz for 2 hours to 10 hours.

3. The aerogel blanket of claim 1, wherein the aerogel blanket has a rate of increase in thermal conductivity after vibration ranging from 0.10% to 1.45%, when vibrating the aerogel blanket at a frequency of 1 Hz to 30 Hz for 2 hours to 10 hours.

4. The aerogel blanket of claim 1, wherein the aerogel blanket has the number of aerogel particles ranging from 10,000 to 58,000 per ft$^3$, which are separated from the aerogel blanket and have a particle diameter of more than 0.5 μm to 1.0 μm or less, when vibrating the aerogel blanket at a frequency of 1 Hz to 30 Hz for 2 hours to 10 hours.

5. The aerogel blanket of claim 1, wherein the aerogel blanket has the number of aerogel particles ranging from 3,000 to 28,000 per ft$^3$, which are separated from the aerogel blanket and have a particle diameter of more than 1.0 μm to 2.0 μm or less, when vibrating the aerogel blanket at a frequency of 1 Hz to 30 Hz for 2 hours to 10 hours.

6. The aerogel blanket of claim 1, wherein the aerogel blanket has the number of aerogel particles ranging from 500 to 4,000 per ft$^3$, which are separated from the aerogel blanket and have a particle diameter of more than 2.0 μm to 5.0 μm or less, when vibrating the aerogel blanket at a frequency of 1 Hz to 30 Hz for 2 hours to 10 hours.

7. The aerogel blanket of claim 1, wherein the aerogel blanket has the number of aerogel particles ranging from 10 to 700 per ft3, which are separated from the aerogel blanket and have a particle diameter of more than 5.0 pm to 10 pm or less, when vibrating the aerogel blanket at a frequency of 1 Hz to 30 Hz for 2 hours to 10 hours.

8. The aerogel blanket of claim 1, wherein the aerogel blanket has a rate of weight reduction after the vibration is 0.3 wt % or less, when vibrating the aerogel blanket at a frequency of 1 Hz to 30 Hz for 2 hours to 10 hours.

9. The aerogel blanket of claim 1, wherein the aerogel blanket is a hydrophilic silica aerogel blanket or a hydrophobic silica aerogel blanket.

10. The aerogel blanket of claim 1, which is produced by a production method comprising:
adding a catalyzed sol and a blanket base to a reaction container to impregnate the catalyzed sol into the blanket base; and
gelating the blanket base impregnated with the catalyzed sol while rotating the blanket base, adding the blanket base wound around a bobbin to the reaction container and
rotating the bobbin to allow the blanket base impregnated with the catalyzed sol to rotate.

11. The aerogel blanket of claim 10, which is produced by the production method further comprising:
after the gelating, aging; and
surface-modifying.

12. The aerogel blanket of claim 11, wherein the aging and the surface-modifying are carried out in a reaction container while rotating the wet-gel blanket composite.

13. The aerogel blanket of claim 11, wherein the surface-modifying is performed by a surface-modifying agent including a polar solvent, and the polar solvent comprises methanol, ethanol or isopropyl alcohol.

14. The aerogel blanket of claim 1, wherein the aerogel blanket is produced by supercritical drying of wet gel blanket, and the aerogel blanket is surface modified with an organosilane compound comprises at least one of trimethylchlorosilane, (TMCS), hexamethyldisilazane (HMDS), trimethylethoxysilane, ethyltriethoxysilane or phenyltriethoxysilane.

* * * * *